US011579984B2

(12) United States Patent
Murti et al.

(10) Patent No.: US 11,579,984 B2
(45) Date of Patent: Feb. 14, 2023

(54) AUTOMATIC STORAGE TARGET RECOMMENDATIONS USING A STORAGE CLASSIFIER

(71) Applicant: EMC IP Holding Company LLC, Hopkinton, MA (US)

(72) Inventors: Arun Murti, Mission Viejo, CA (US); Adam Brenner, Mission Viejo, CA (US); Mark Malamut, Aliso Viejo, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 205 days.

(21) Appl. No.: 17/071,512

(22) Filed: Oct. 15, 2020

(65) Prior Publication Data
US 2022/0121531 A1   Apr. 21, 2022

(51) Int. Cl.
*G06F 11/14* (2006.01)

(52) U.S. Cl.
CPC ...... *G06F 11/1464* (2013.01); *G06F 11/1469* (2013.01); *G06F 2201/84* (2013.01)

(58) Field of Classification Search
CPC ............ G06F 11/1453; G06F 11/1456; G06F 11/1464; G06F 11/1469; G06F 2201/84
See application file for complete search history.

(56) References Cited

U.S. PATENT DOCUMENTS

| | | | |
|---|---|---|---|
| 8,935,493 B1* | 1/2015 | Dolan | G06F 3/0649 711/161 |
| 9,703,664 B1* | 7/2017 | Alshawabkeh | G06F 3/067 |
| 11,042,452 B1* | 6/2021 | McNutt | G06F 11/1466 |
| 2007/0033098 A1* | 2/2007 | Peters | G06Q 30/02 705/26.1 |
| 2016/0147759 A1* | 5/2016 | Bolik | G06F 16/21 707/723 |
| 2016/0191509 A1* | 6/2016 | Bestler | H04L 63/0876 713/193 |
| 2017/0220424 A1* | 8/2017 | Doshi | H04L 41/5019 |
| 2019/0050296 A1* | 2/2019 | Luo | G06F 8/65 |
| 2019/0050302 A1* | 2/2019 | Juniwal | G06F 3/0689 |
| 2019/0258530 A1* | 8/2019 | Moldvai | G06F 9/485 |
| 2020/0057813 A1* | 2/2020 | Adrian | G06F 16/14 |
| 2020/0202272 A1* | 6/2020 | Aravamudhan | G06N 3/08 |
| 2020/0241756 A1* | 7/2020 | Lee | G06F 3/065 |
| 2020/0410418 A1* | 12/2020 | Martynov | G06F 11/1461 |
| 2021/0124651 A1* | 4/2021 | Srinivasan | G06F 9/5077 |

* cited by examiner

*Primary Examiner* — Merilyn P Nguyen
(74) *Attorney, Agent, or Firm* — Staniford Tomita LLP (57) ABSTRACT

Embodiments for a storage classifier that provides recommendations to a backup server for storage targets among a plurality of disparate target storage types. The storage classifier receives metadata (name, type, size), and the Service Level Agreement with information such as: retention time, Recovery Point Objective, and Recovery Time Objective) from the backup software. The backup software itself receives policy recommendations from a data label rules engine based on certain file attributes. The storage classifier receives an initial recommendation for the storage type and location (e.g., on-premises deduplication storage or public-cloud object storage, etc.) from a data classifier. Based on these inputs, the storage classifier provides recommended specific storage targets to the backup software on a file-by-file basis for data stored in a backup operation.

17 Claims, 6 Drawing Sheets

Storage Target List 302

| Network Address | Physical Location Type | SKU | Storage Type | Used Capacity (GB) | Total Capacity (GB) | ... |
|---|---|---|---|---|---|---|
| ddve1.company.com | CLOUD | 123 | DEDUPE | 23 | 96 | ... |
| ecs1.company.com | ONPREMISE | 456 | OBJECT | 949 | 1024 | ... |
| pmax1.company.com | ONPREMISE | 789 | FILE | 404 | 512 | ... |
| ... | ... | ... | ... | ... | ... | ... |

Product Catalog 304

| SKU | Product Name | Storage Type | Form Factor | Capacity Increment (in GB) | Cost per GB (in USD) | ... |
|---|---|---|---|---|---|---|
| 123 | PowerProtect DD | DEDUPE | CLOUD | 8192 | 0.25 | ... |
| 124 | PowerProtect DD | DEDUPE | VIRTUAL | 8192 | 0.125 | ... |
| 456 | ECS | OBJECT | PHYSICAL | 1024 | 0.05 | ... |
| 789 | PowerMax | FILE | PHYSICAL | 1024 | 1.00 | ... |
| ... | ... | ... | ... | ... | ... | ... |

AUTOMATIC STORAGE TARGET RECOMMENDATIONS USING A STORAGE CLASSIFIER

TECHNICAL FIELD

This invention relates generally to computer backup systems, and more specifically to automatically recommending optimal storage for backup and restore operations.

BACKGROUND

Backup software is used by large organizations to store virtually all of the data of the organization for recovery after system failures, routine maintenance and so on. Backup sets are typically taken on a regular basis, such as hourly, daily, weekly, and so on, and can comprise vast amounts of data. As organizations and users use different applications to generate and process data, the variety of data can be very vast in terms of type and source. Data storage networks typically include various types of storage media to store this disparate original data. For example, hard disk drive (HDD) or tape drive devices may be used as long term storage as it is relatively inexpensive and readily available. Access times to these devices may be slow, however, so faster but costlier memory, such as Solid State Drives (SSD) or Flash memory or other similar cache memory may be used for data that is accessed more frequently. Cloud storage also provides different types of storage based on different costs and service level agreements (SLAs).

Different types of files may require specific memory storage requirements, such as compressible versus non-compressible files, sensitive data versus public data, and so on. Data is often classified in terms of its value, importance, or frequency and criticality of access with respect to the specific storage on which the data is to be stored. In some systems, users may be able to classify and assign storage mediums on their own, but the backup software limits them on a per asset basis and not on a per file basis. Operating systems and certain drives may incorporate some intelligence to determine what data is 'hot' and should remain in cache memory versus what data is 'cold' and can remain on slower, cheaper storage. Such solutions, however, are critically limited to specific data transfer operations and do not consider all of the possible storage media that may be provided in a user's entire system infrastructure.

Users generally desire to not only have their data protected, but protected intelligently. For example, by using certain data labeling processes, backup software can use data labels to automatically assign policy attributes, such as whether files can be replicated off-site. Additionally, by using the data classifiers, the backup software can automatically classify files based on their properties to determine the best type of storage target to choose, from a variety of options depending on factors like SLAs and cost. Even with these recommendations, however, backup software cannot intelligently decide which specific storage target instance to use for a file from among different types of systems in different locations (e.g., two Dell EMC ECS systems on-premise or one AWS S3 bucket in the public cloud). The cost in both time and money to have backup administrators manually optimize the use of those targets on a per-file basis is practically infeasible. Backup software also cannot easily provide recommendations to the user regarding how to manage the growth of each different types of storage in their environment, or easily allow users to optimize for attributes like cost instead of performance.

What is needed, therefore, is a data backup system that automatically considers multiple storage media devices across multiple storage environments across a user's entire infrastructure.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects are described in conjunction with such embodiment(s), it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the certain methods and processes described herein. Applications may also be downloaded, in whole or in part, through the use of a software development kit or toolkit that enables the creation and implementation of the described embodiments. In this specification, these implementations, or any other form that embodiments may take, may be referred to as techniques. In general, the order of the steps of disclosed processes may be altered within the scope of the embodiments.

Some embodiments involve data processing in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a storage classifier and interface that works in conjunction with a data classifier to automatically classify each file that is part of a backup operation and assign an appropriate storage medium (e.g., deduplicated, object, tape, on-premise, cloud, etc.) for each file being backed up in order to optimize storage costs, and meet user SLAs for their data protection use cases.

Figure 1:
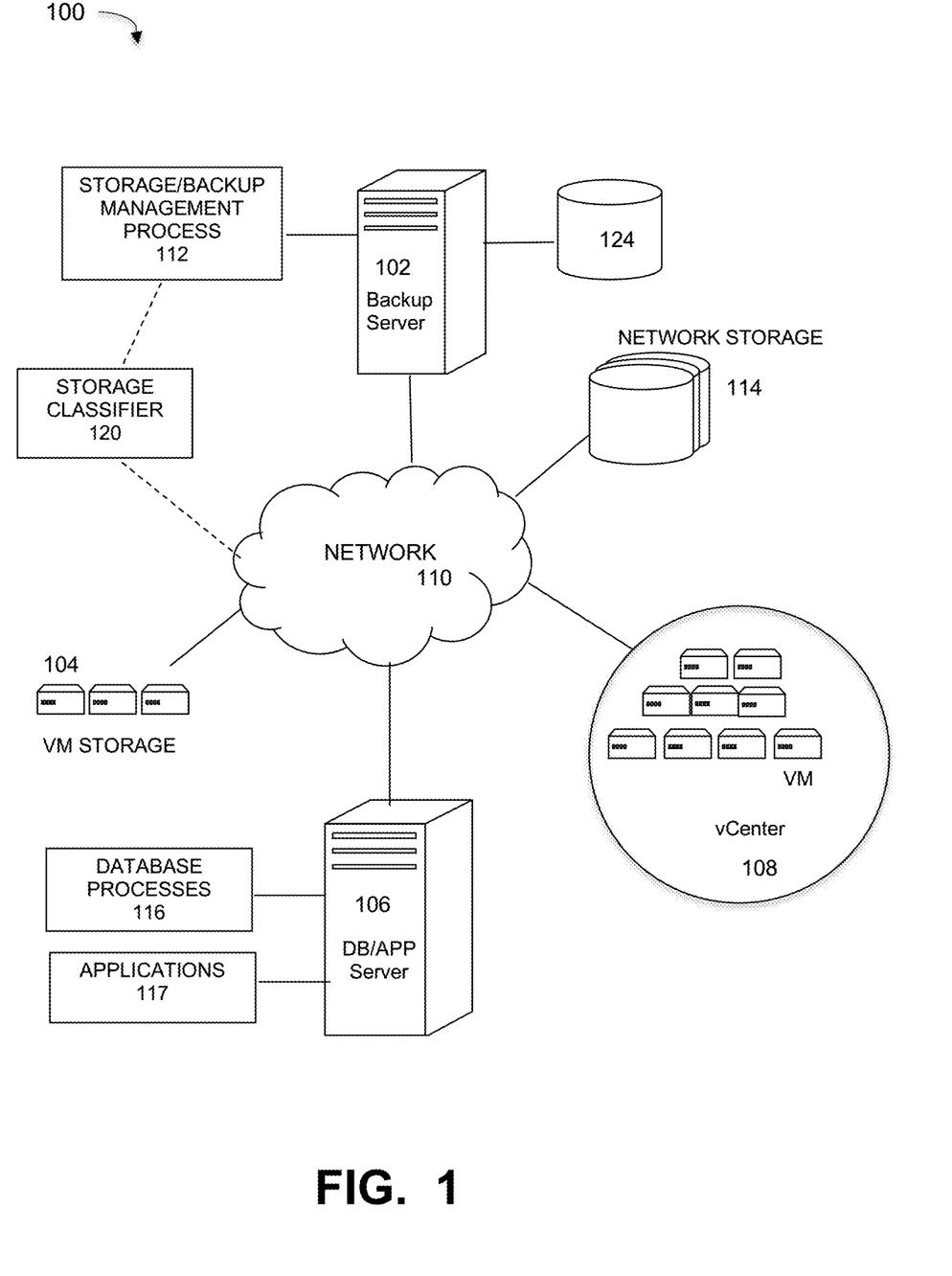
FIG. 1 is a diagram of a network implementing a storage classifier for data backup systems, under some embodiments.

FIG. 1 illustrates a computer network system that implements one or more embodiments of a network data backup system implementing a storage classifier process, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs may be provided to serve as backup targets. FIG. 1 illustrates a virtualized data center (vCenter) 108 that includes any number of VMs for target storage. The VMs or other network storage devices serve as target storage devices for data backed up from one or more data sources, such as a database or application server 106, or the data center 108 itself, or any other data source, in the network environment. The data sourced by the data source may be any appropriate data, such as database 116 data that is part of a database management system or any appropriate application 117. Such data sources may also be referred to as data assets and represent sources of data that are backed up using process 112 and backup server 102.

The network server computers are coupled directly or indirectly to the network storage 114, target VMs 104, data center 108, and the data sources 106 and other resources through network 110, which is typically a public cloud network (but may also be a private cloud, LAN, WAN or other similar network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

Backup software vendors typically provide service under a service level agreement (SLA) that establishes the terms and costs to use the network and transmit/store data specifies minimum resource allocations (e.g., storage space) and performance requirements (e.g., network bandwidth) provided by the provider. The backup software may be any suitable backup program such as EMC Data Domain, Avamar, and so on. In cloud networks, it may be provided by a cloud service provider server that may be maintained be a company such as Amazon, EMC, Apple, Cisco, Citrix, IBM, Google, Microsoft, Salesforce.com, and so on.

The storage media provided by the various different storage resources may be of any appropriate media type, cost, and location. For example, network storage 114 may be implemented by tape, HDD, SSD, flash or other storage media, while VM storage 104 or 108 may also use some or all of these media types as well as part of a shared (virtualized) resource pool. Each media type may provide different properties with respect to cost versus performance and retention time. For example, tape and HDD are generally cheaper in terms of cost but are lower performance with respect to access latencies, while flash memory is fast but expensive. Another important distinction is between on-premises storage versus cloud or off-premises storage. On-premises storage generally refers to storage physically located at a user site or that is closely coupled to a user network, such as storage 124 associated with backup server 102. This type of storage may be required for certain highly sensitive data that should not be risked to exposure on a public network. Cloud storage, such as may be provided by data center 108 is typically memory shared through multi-tenant processes and comprises cheap, voluminous data for long-term storage of legacy data or data that is generally not overly sensitive.

In most large-scale enterprises or entities that process large amounts of data, different types of data are routinely generated and must be backed up for data recovery purposes. System 100 includes a storage classifier that works in conjunction with certain data classification processes to classify what types of files are being backed up and assign the most efficient storage medium to store those files for data protection use cases. For the embodiment of FIG. 1, the storage classifier 120 may be implemented as a component that runs within a data protection infrastructure, and can be run as an independent application or embedded into an instance of data protection software 112 or a data protection appliance. Any of those implementations may be on-premise within a user's data center or running as a hosted service within the cloud.

In an embodiment, the storage classifier process 120, works in concert with data classifier and data labeling processes to automatically recommend a specific storage target instance for each file. It catalogs a user's target storage systems, monitors their utilization, and provides backup software with a score for each potential target for a file based on cost, performance, and balanced use of capacity. For example, if the user optimizes for cost, given a file that is likely to deduplicate and is associated with a policy that specifies fast recovery times, the storage classifier can recommend a particular storage cluster in the user's local datacenter over a Flash memory array with higher restore performance, but also a higher cost.

Embodiments also include using a catalog of new storage available for installation or purchase, the storage classifier also enables recommendations about what type of storage to procure to optimize for each different factor. The storage classifier thus makes it feasible for backup software to automatically optimize the use of target storage on a per-file basis and for users to optimally manage the growth of their network environment.

Figure 2A:
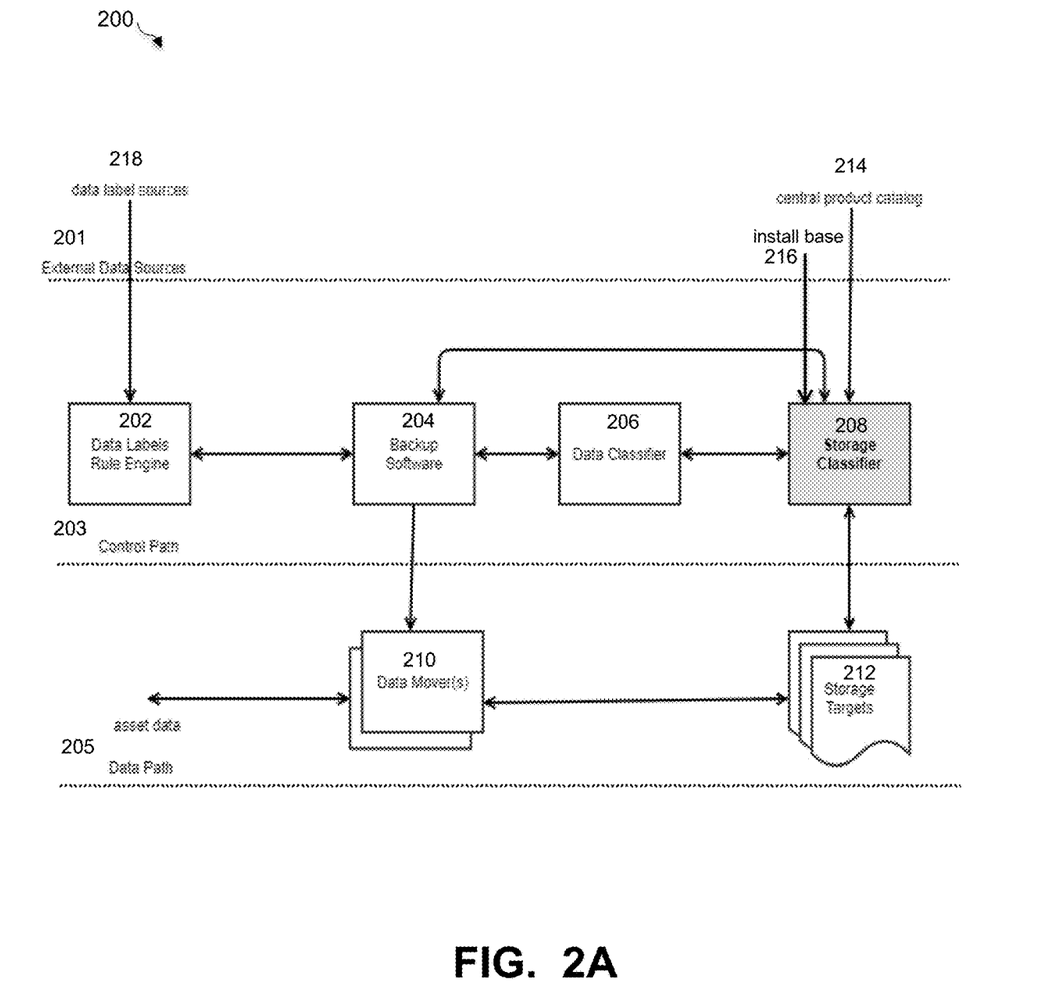
FIG. 2A illustrates the storage classifier of FIG. 1 used in conjunction with a data classifier and a data labeling process, under some embodiments.

FIG. 2A illustrates the storage classifier process of FIG. 1 used in conjunction with a data classifier and a data labeling process, under some embodiments. FIG. 2A illustrates an overall data protection system 200 having a control path 203 among different components to move asset data along a data path 205. Certain external sources 201 provide relevant data to the components of the control path. The components include backup software 204, which moves data from assets (data sources) through data movers 210 to target storage media 212. The backup software receives input from a data labels rule engine (DLRE) 202, a data classifier 206, and a storage classifier 208 to move appropriately classified data to the optimum storage target.

The purpose of the data classifier 206 is to classify what types of files are being backed up and assign the most efficient storage medium to store those files for data protection use cases. For example, certain data may be more eligible for deduplication processes, and the storage target should be chosen accordingly. Deduplication storage targets are the most cost-effective when data deduplicates efficiently. Such documents can be business documents, text files, VMDKs, and so on. Conversely, non-deduplication storage, like object or tape, is the most cost-effective media for non-compressible types of files, such as movies, images, or files that are already compressed (unless there happen to be many copies of the same file). Present backup software does not have the intelligence to automatically classify the types of files and assign them the correct storage medium to use. Though users may be able to manually determine the storage medium on a case-by-case basis, they must know what types of data they have in their entire system, how many copies of each file exist, have a deep technical understanding of each storage medium, and be vigilant in sorting and classifying data as it grows over time. This is practically impossible in systems with large amounts of data. Moreover, even if the user does all this, backup software typically limits what storage to use on an entire asset basis versus on a per-file basis. The data classifier 206 overcomes this by automatically classifying each file that is part of a backup and assigning the appropriate storage medium (e.g., deduplication, object, or tape) for each file, to optimize costs and meet user SLAs.

The data labeler process 202 provides a service usually not provided by backup software, which is the ability to tag data based on the it's characteristics, such as confidential, public, top-secret, user information, and so on. Each characteristic can have different levels of associated attributes; for example, public data can be accessed by everyone and stored anywhere, while top-secret data may only be accessed by certain individuals and must be stored on local encrypted storage. The DLRE 202 provides a mechanism for the backup software 204 to (1) identify data characteristics and assign data labels, (2) discover existing data labels, and (3) make decisions based on the data labels, like how to set policy attributes (e.g., if data can be replicated) or whether service level objective (SLO) compliance has been met.

The backup software's catalog must be able to assign storage targets at a per-file level, rather than at a per-backup level. In conjunction with the DLRE 202 and the data classifier 206, the storage classifier 208 implements the high-level operations of providing a recommended storage target for each file in the backup data set, and recommend new storage targets (such as for purchase).

Figure 2B:
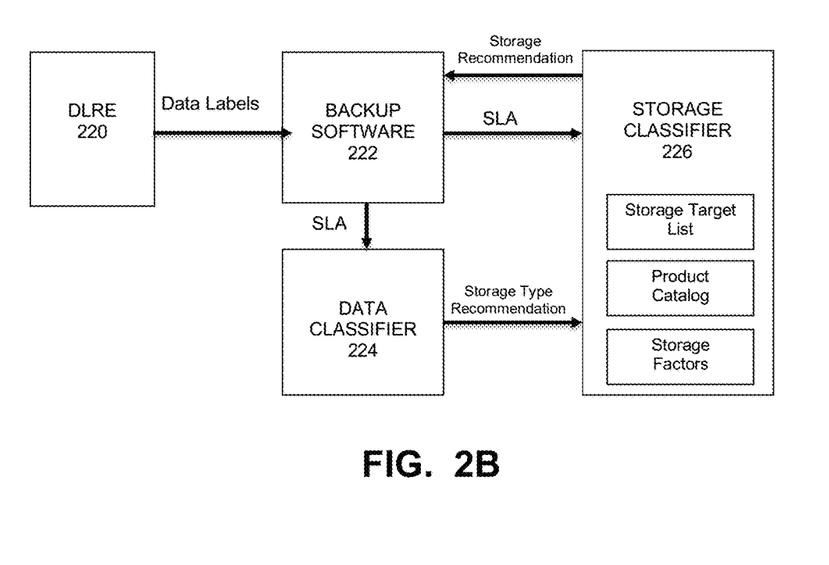
FIG. 2B illustrates data transfers to and from the storage classifier, under some embodiments.

FIG. 2B illustrates the interface between the storage classifier and the backup software, under some embodiments. The storage classifier 226 receives metadata (name, type, size), and the SLA with information such as: retention time, RPO (recovery point objective), RTO (recovery time objective) from the backup software 222. The backup software itself receives policy recommendations from the DLRE 220 based on the data label or other attributes of the file. The storage classifier receives from data classifier 224, a recommendation for the storage type and location (e.g., on-premises deduplication storage or public-cloud object storage, etc.). The storage classifier 226 ultimately provides recommended storage targets to the backup software on a file-by-file basis for data stored in a backup operation.

In general, the data classifier 206 provides an initial recommendation to the storage classifier that recommends only the type and location of storage to use (e.g., deduplication, on-premise, etc.) based on the data's properties, such as may be provided by the DLRE 202. The storage classifier 226, in contrast, examines all possible target instances (e.g., the user may have hundreds of deduplication devices on-premise) to recommend the exact target instance based on the optimization factors selected by the user. The data classifier 224 thus only recommends a general target type, but does not know about specific available targets nor the user preferences. The data classifier would thus not know whether DDR #123 is the best target for maximizing the balance of data, for example. The storage classifier, however, would return DDR #123 along with other possible targets as a final recommendation to the backup software 204 based on the specific target instances available and the preferences of the user, along with other possible factors.

As shown in FIG. 2B, the storage classifier 226 contains the following databases as internal components: (1) a storage target list, (2) a product catalog, (3) and storage factors. These databases can be maintained internally to the storage classifier using an embedded database engine like SQLite. Depending on the form factor, the storage classifier can also use an external DBMS such as PostgreSQL or a hosted database services such as Amazon Aurora. One or more of these databases can also be stored and accessed external to the storage classifier.

Figure 3:
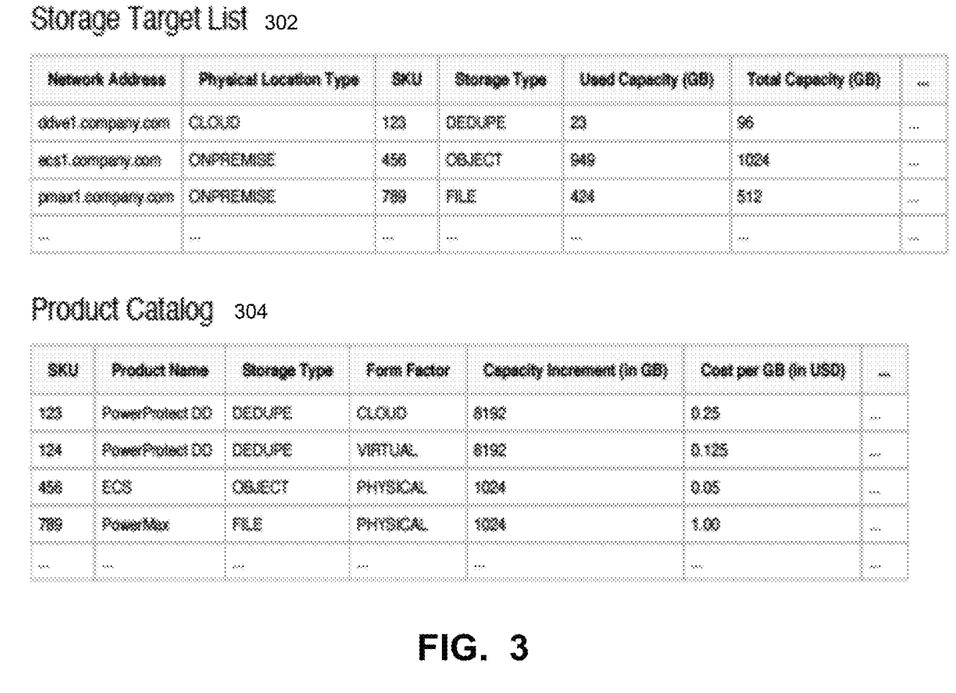
FIG. 3 illustrates an example storage target list and an example product catalog, under some embodiments.

In an embodiment the storage target list stores a list of available storage targets, including the following information (at a minimum): type, network location, physical location, and capacity. FIG. 3 illustrates an example storage target list 302 under some embodiments. Table 302 includes several different columns for the various target parameters. These include network address, physical location type, SKU (or product identifier), storage type, used capacity, and total capacity. The storage type indicates whether the data is deduplication data, object storage, and so on. The network location specifies the fully qualified domain name (FQDN), hostname, IP address, ports, and so on. The physical location type specifies whether the storage is an on-premises data center, a public cloud provider, and so on. The capacity indicates the used and total amount of storage memory. The storage target list is used to provide the recommendations for where to store a file being backed up.

FIG. 3 also illustrates an example product catalog 304 under some embodiments. Table 304 includes several different columns for the various storage product parameters. These SKU, product name, storage type, form factor, capacity, and cost per unit storage. The central product catalog 212 can be populated via the following three methods. First, the storage classifier may provide APIs that the backup software 204 can call to add, edit, or remove a storage target. The backup software may have its own list of storage targets and is responsible for keeping that list in sync with the storage classifier. Second, the storage classifier may call the backup software's own APIs to retrieve the current list of attached storage targets and update its catalog. Third, discovery through standard networking approaches (e.g., LLDP) may be used. Authentication and authorization mechanisms such as the use of credentials or exchange of certificates may be required for the storage classifier to communicate with the storage targets.

In an embodiment, the storage classifier also holds a catalog of storage targets available for purchase. Updates are securely retrieved from a central product catalog via API, such as a REST API. The items available for purchase can include (but are not limited to): physical storage appliances that must be shipped to a location and manually provisioned before becoming available for use; software-defined appliances (e.g., VMs or containers) that can be downloaded and deployed automatically onto a user's existing infrastructure. Additional licensed capacity that can be enabled on a system with one of the above form factors. Each item in the catalog is considered a SKU, with the following associated data (at a minimum): product name (e.g., PowerProtect Data Domain Virtual Edition, ECS), type (e.g., deduplication, object), form factor (e.g., physical, virtual, public cloud, license), capacity increment in TB (e.g., 1000 TB for physical DD, or 8 TB for DD VE license), and cost per front-end TB (should reflect the final cost after accounting for factors like average compression, average deduplication, and business factors such as discounts from list price).

The storage classifier updates its storage target list 302 and product catalog 304 on a regular basis, using the methods described in the corresponding sections above. These updates may be done at a fixed interval (e.g., hourly) or on-demand (e.g., when starting the first backup since the last download of data), or asynchronously, such as on an on-demand basis.

With respect to storage factors, the storage classifier stores scaled weightings (out of 100) for each of the following factors such that the total equals 100: (1) cost factor (default: 50), (2) performance factor (default: 25), (3) balancing factor (default: 25). These weightings can be updated through an API provided by the storage classifier, which can either be called directly or via the backup software. Users can use the weightings to tune the selection of targets to their preference. For example, some users may favor to optimize cost and load balancing over performance, while others may want to maximize performance regardless of cost. The user can change these values at any time. Different or factors may be added or used, though the total weighting would remain at 100.

In an embodiment, the external data sources 201 for the storage classifier 208 include a central product catalog that stores information about various types and models of storage media (disk/tape/flash drives) that are installed or can be installed in network 100. It also includes an install base 216 that is a database of installations for a number of other or similar users. This install base can be queried and leverages to inform the storage classifier of possible or preferred storage devices installed on other networks.

With respect to how the external information is provided to and used by the storage classifier, one example could be a cloud-based (SaaS) platform (such as Dell EMC CloudIQ), where users can monitor all their Dell EMC devices. By connecting to CloudIQ, the storage classifier can get a list of all Dell EMC devices associated with the customer through an Install Base database. The connection would occur using REST APIs or a message bus implemented across a Secure Remote Services (SRS) connectivity, or similar, channel.

Figure 4:
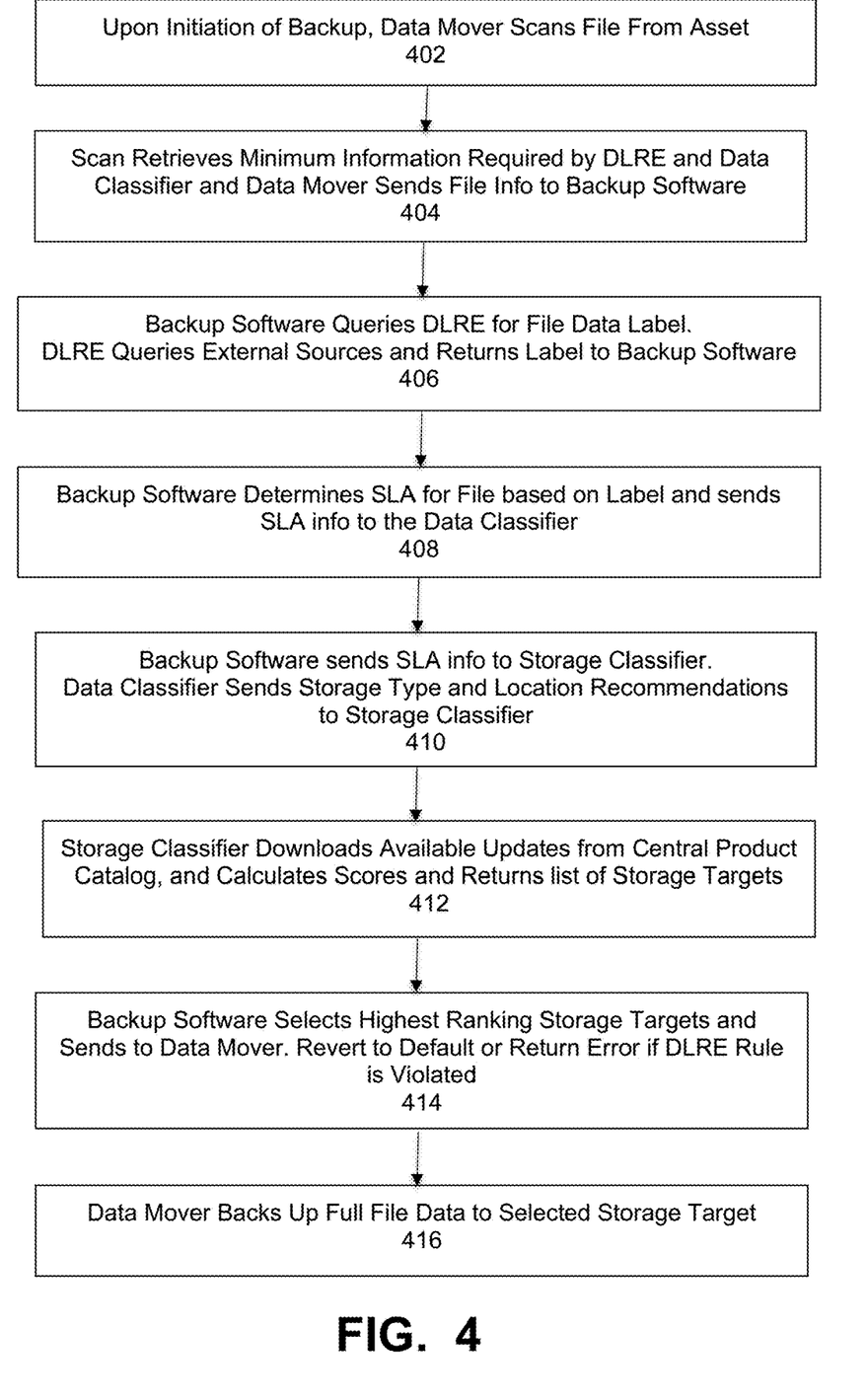
FIG. 4 is a flowchart that illustrates an overall process of classifying and recommending storage in a backup system, under some embodiments.

Using the external information and control path information from the DLRE and the data classifier, the storage classifier 208 ultimately provides recommended storage targets for backed up files. As shown in FIG. 2B, during backup operations, the storage classifier receives the certain information from the backup software 204 and the data classifier 206 as inputs for each file. From the backup software, it receives metadata and the SLA information, where the backup software receives policy recommendations from the DLRE based on data labels; and from the data classifier, the storage classifier receives a recommendation for the storage type and location FIG. 4 is a flowchart that illustrates a method of providing a storage recommendation by a storage classifier, under some embodiments. As shown in FIG. 4, the process begins with the backup software 204 initiating a backup operation, whereupon the data mover 210 scans a file from the asset, 402. The scan retrieves the minimum information required by the DLRE 202 and data classifier 206 (e.g., name, size, extension, header), and the data mover then sends the file information back to the backup software, 404. The backup software 204 queries the DLRE for the data label for the file, and the DLRE 202 queries its external sources 201 if required, 406. External sources can include third-party products (e.g., Microsoft Azure Information Protection) or content search indexes like Data Protection Search, and the like. The DLRE 202 then returns the label (e.g., "Highly Restricted", "Public", etc.) to the backup software 204. The backup software determines the SLA for the file based on the data label (or falls back to default SLA), and sends the SLA and other file info to the data classifier 206, 408. The backup software 204 also sends the SLA and file info to storage classifier 208, while the data classifier, in parallel, sends the storage type and location recommendations to storage classifier, 410.

The storage classifier 208 downloads any available updates from central product catalog 214 if needed (e.g., if the configured time period between updates has passed). The storage classifier also calculates the target score and shadow scores for the file and returns a list of the top (e.g. top 10) storage targets based on current storage factors, 412. The backup software 204 selects the highest ranking storage target from the list that does not violate any DLRE rules and sends that storage target to the data mover 210, 414. A DLRE rule may be violated if, for example, a rule states that the file cannot be stored off-premise and the storage target is in the public cloud. If none of the recommended targets are viable, the backup software 204 may fall back to a default target and raise an alert or fail the backup entirely. The data mover 210 then backs up the full file data to the selected storage target 212, 416.

Figure 5:
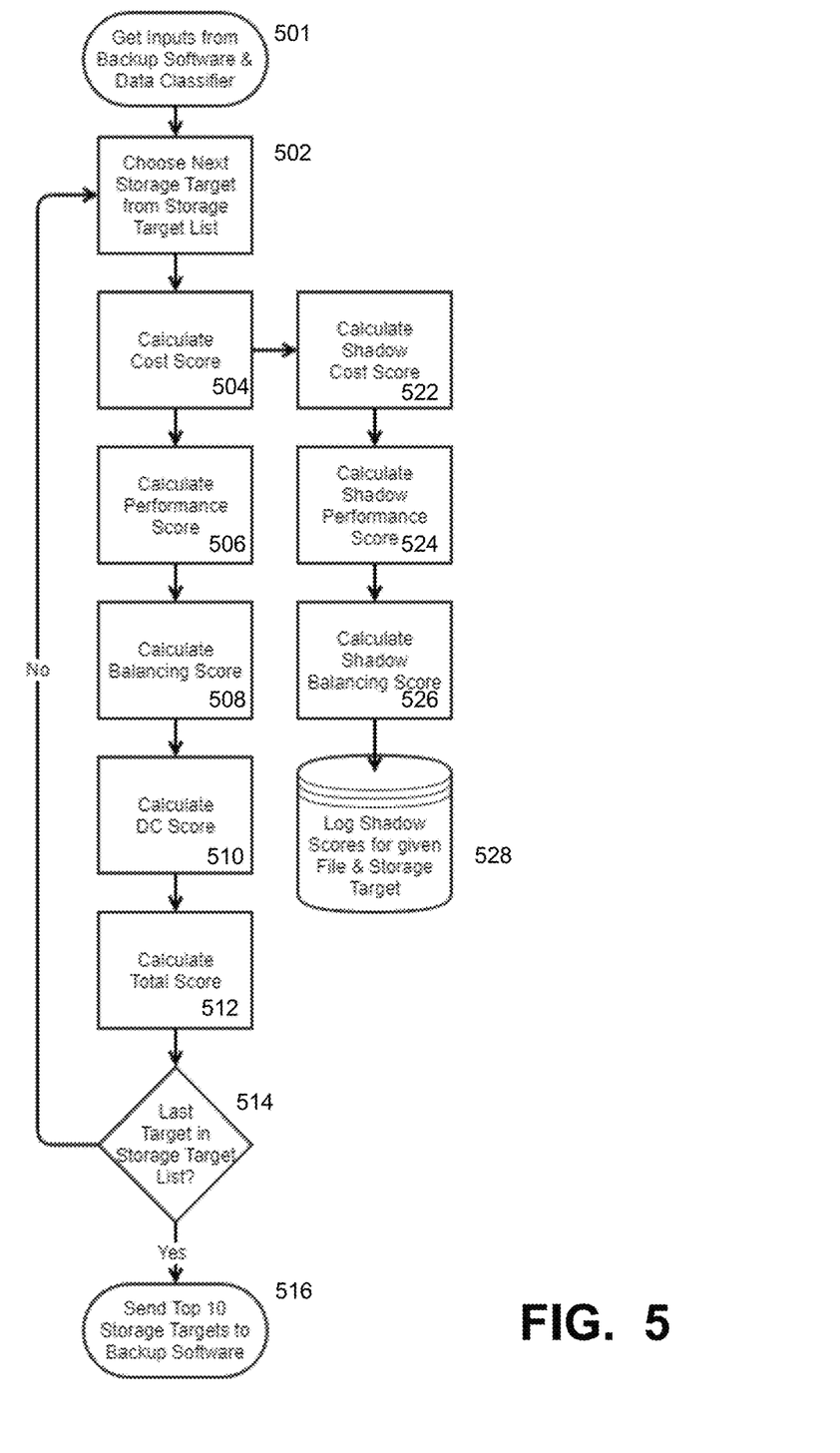
FIG. 5 is a flowchart that illustrates a process of determining storage target scores, under some embodiments.

In an embodiment, the storage classifier 208 determines a storage target recommendation based on a scoring process. FIG. 5 is a flowchart that illustrates a process of determining storage target scores, under some embodiments. The process of FIG. 5 begins with the storage classifier obtaining inputs from the backup software and the data classifier, 501. Storage targets are selected from a storage target list 502 that is built up over time. In steps 504 to 508, the storage classifier calculates a cost score, performance score, and balancing score. The data classifier score is calculated in step 510, and from all of these scores the total score is calculated, 512. These scores are calculated for each target in the target list, so in step 514, it is determined whether or not the present target is the last target in the storage target list. If not, the process iterates from step 502 to calculate the scores for the next target in the storage target list. If it is the last target, the process sends the top N (e.g., 10) scoring storage targets the backup software, 516. In parallel to the calculation of the total score, the storage classifier also calculates shadow scores for the targets. Thus, in steps 522 to 526, the storage classifier calculates the shadow cost, performance and balancing scores. It then logs these shadow scores for a the given file and storage target, 528. This shadow score calculation is performed for each current storage target that is being scored in steps 504 to 512. Details regarding each scoring step are provided in greater detail below.

For each file, the storage classifier evaluates each potential storage target and computes a target score to indicate the target's suitability to store the file. The target score incorporates scores for each of the storage factors: cost, performance, and load balancing. In an embodiment, the calculation of the target score may be expressed as:

Target Score=((Cost Score)+(Performance Score)+(Balancing Score)/3)×(DC Score/100).

As described above, a list of the top 10 storage targets based on target score is returned to the backup software. The backup software may choose the storage target with the highest score, or one further down the list if there are specific rules (e.g., from the DLRE) that must not be violated when storing the file (e.g., if a rule states that the file cannot be stored off-premise and the target is in the public cloud). If none of the recommended targets are viable, the backup software may select a default target and raise an alert or fail the backup entirely.

As shown above, the target score is, in part, a function of the cost score. In an embodiment, the calculation of the target score may be expressed as:

Cost Score=(Cost Factor)×(Storage Cost Score).

The cost factor is the value described for the storage factors of cost (cost score), performance (performance score), and load balancing (balancing score). The storage cost score is a value from 0-100 indicating the relative cost per TB, as listed in the product catalog. For simplicity, the storage classifier uses the original size of the file (i.e., front-end). It is the responsibility of the central product catalog 212 to ensure that it accurately reflects the final costs after accounting for factors like compression, deduplication, and business factors such as discounts from list price. The type of target with the lowest cost per unit of storage (e.g., terabyte, TB) is the reference point and given a score of 100 and other targets' scores are measured based on the ratio of their cost per storage unit to that of the reference point. For example, if the cheapest target is an on-premise object store that costs $100/TB, its score would be 100, and then an all-flash de-duplication system that costs $3,000/TB would have a score of 3.333.

The target score is also a function of the performance score. In an embodiment, the calculation of the performance score may be expressed as:

Performance Score=(Performance Factor)×(Storage Performance Score)

The performance factor is the value described in Storage Factors above. The storage performance score is a value from 0-100 indicating the ability of the storage target to meet the RTO for the file. For example, if the RTO is 1 hour, the target can restore 1 TB/hour, and the size of the file is 1 TB, then the score is 100. Given the same values, but if the target could restore at only 500 GB/hour, then the score would be 50.

The target score is also a function of the balance score. In an embodiment, the calculation of the balance score may be expressed as:

Balancing Score=(Balancing Factor)×(Storage Balancing Score).

The balancing factor is the value described in storage factors above. The storage balancing score is a value from 0-100, with higher scores corresponding to the systems in the lower quartiles of capacity usage for that type of system. For example, dedupe targets are assigned 50 points if they are within the first quartile of capacity utilization across all dedupe targets, 30 points for the second quartile, 20 points for the third quartile, and 10 points for the fourth quartile. These point values are user configurable and may be tuned as needed to ensure the desired distribution of capacity utilization.

The data classifier score is a value from 0-100 that represents how closely the target follows the data classifier's recommendation. It gets 50 for matching the location and 50 for matching the storage type. If the DC recommends on-premise dedupe storage and the target is an on-premise PowerProtect Data Domain, then the score is 100. If the data classifier recommends public-cloud object storage, and the target is an on-premise ECS, then the score is 50. If the target doesn't match the data classifier recommendation at all, then the score is 0.

With respect to deduplication, for deduplication storage targets, the storage classifier does not do any additional analysis to optimize deduplication by co-locating assets. To achieve that, the storage target can be a cluster or federated system that implements scale-out global deduplication (e.g., PowerProtect X400 or Global Scale).

In an embodiment, for each file, the storage classifier calculates a set of shadow scores, as shown in FIG. 5. The calculation of a shadow cost target score can be expressed as:

Shadow Cost Target Score=(100+(Performance Score)+(Balancing Score)/3)×(DC Score/100).

Shadow Performance Target Score=((Cost Score)+ 100+(Balancing Score)/3)×(DC Score/100).

Shadow Balancing Target Score=((Cost Score)+(Performance Score)+100/3)×(DC Score/100).

The shadow score for a factor represents what the target score would have been if the factor were artificially fixed to be the maximum value of 100. That is, a shadow score represents a score assigned to a most optimum storage target for that factor. The shadow scores for each combination of file and target are logged for a certain period of days (e.g., 30 days), which is a configurable value), and is used to help generate recommendations for new storage targets. To recommend new storage targets (for purchase or procurement), the storage classifier provides an API for which the output is a list of new storage targets recommended for purchase. Each item in the list shows: The recommended SKU from the product catalog 214. The factors for which the recommendation is optimized are: current cost, performance, or balancing. It is up to the backup software or other users of the storage classifier to determine when to call the API. For example, the query can happen periodically (e.g., once per day) or only when the percentage of total available capacity of a specific storage type falls below some alerting threshold.

Embodiments also provide recommendations optimized for the current storage factors. The storage classifier uses the following logic to determine what type of storage to recommend to continue with the current weighting of storage factors: if any storage target system's capacity utilization is above a certain warning threshold, then the storage classifier will recommend another system of the same type. The warning threshold is configurable and defaults to a nominal value like 80%. To determine what size of the new system to recommend, the storage classifier will query historical capacity utilization across all systems of that type from its storage list, forecast the usage for the next N days, and determine the required amount of capacity. The number of days (N) is configurable and defaults to a nominal value (e.g., 180). The algorithm used for forecasting may be standard linear regression or a more advanced machine learning-based method.

Embodiments further include providing recommendations optimized for new storage factors. While the recommendations optimized for the current storage factors takes a more traditional approach, the storage classifier also leverages its unique capabilities to recommend what types of targets the user could buy to shift towards a different weighting of storage factors. For example, if the user is currently optimizing for cost, they may also want to know what it would take to optimize for performance. These recommendations are enabled by the shadow scores described above. The logged shadow scores for each factor for each system are averaged across a given system type and compared against a configurable threshold (defaults to a nominal value like 80%). For example, if the average shadow cost Target score for a certain network (e.g., PowerProtect DD) exceeds the threshold of 80%, then for all the files evaluated during the logging period, the cost score would have improved its target score if cost were a highly weighted storage factor. The list returned to the backup software would then contain DD's SKU with the "Cost" factor specified. The backup software can use that information to recommend to the user that to reduce cost, they might consider buying more storage capacity and re-configuring the storage classifier's storage factors to weigh cost more heavily.

As shown in the embodiment of FIG. 2A, the storage classifier 208 works with a data classifier 206 and DLRE 202 to receive certain data classification and label information to evaluate storage targets for recommendation to the backup software 204. Any appropriate data classifier and labeling process may be used to provide the relevant information to the storage classifier, and certain specific embodiments are described below.

Data Classifier

In an embodiment, the data classifier is an automated process that determines which user data should be stored on a specific storage medium based on deduplication storage (such as DataDomain), object storage or tape drives. In general, backup software can store individual files within a single backup on different storage mediums. Using different storage media typically requires using separate backups for the same asset. It is very common for a specific asset to have data that deduplicates and compresses efficiently, but also have data that does not. For example: an end-user desktop may have both pictures and movies that do not dedupe efficiently, but also have business documents that do.

The data classifier can be implemented a library or program integrated with the backup software. During backup time, the backup software will provide the data classifier with certain items of that the it uses of its intelligence: (1) file name, (2) file extensions, (3) file size, (4) magic numbers within a file, (5) MIME type, (6) information on previous copies of the file, and (7) policy (including SLA) and backup schedule. The data classifier uses the above information to 1) classify each file within a backup and 2) assign one or more appropriate storage mediums. These are the return values from the data classifier to the storage classifier.

The backup software is responsible for assigning and keeping track of which file is located on which storage medium. Storing compressed files on deduplication storage may cause an increase in storage and lower the overall efficiency of the entire storage system. Additionally, deduplication storage is typically more expensive than non-deduplication storage. On the other hand, the data classifier might also recognize this particular compressed file is duplicated across a user's entire environment and each instance is the same. The data classifier in this case would make a recommendation to store this file on deduplication storage. This level of intelligence is not something can be performed on a file by file basis for an entire environment.

DLRE

The DLRE component provides a data labeling capability that is typically not provided in present backup software. Data labeling is the ability to automatically tag data based on certain characteristics, such as confidential, public, top secret, user information, and so on, as examples. Each characteristic can have different levels of associated attributes, for example: public data can be accessed by everyone and stored anywhere, while top secret data may only be accessed by certain individuals and must be stored on local encrypted storage.

The DLRE provides a mechanism for backup software to (1) identify data characteristics and assign data labels, (2) discover existing data labels and (3) make decisions based on the data labels, such as how to set policy attributes (e.g., if data could be replicated) or whether SLO compliance has been met.

For data that does not have a data label, the DLRE can assign a data label. If data already has a label, the backup software will not overwrite it, but preserve it. In order to identify data characteristics, backup software will perform full content indexing on the data using known methods in the industry. These methods can include an inline or post-process that reads the content of known data types such as text, doc, xls, ppt, pdf, etc. This is how the Data Protection Search product operates today.

For each known data type on which we perform full content indexing, the DLRE can look for different data characteristics that match patterns supplied by the user. These patterns can be well known patterns such as personal identification information (PII) patterns (e.g., social security numbers, phone numbers, address, etc.). Alternatively, patterns can be supplied by the user to match their use cases (financial code, algorithms specific to their company, etc.). Besides looking at the content of files using full content indexing, the DLRE process will also consider file names to help classify the data. This is useful to quickly identify and label data without the need of full content indexing. For example, all Office documents can be treated as internal use.

Regardless, patterns are defined as regular expressions and stored in a database. The regular expression database will have three columns: one for the regular expression of file names, one for the content regular expression and one for the label type to assign. The label type can be free-form text that defines it, e.g.: confidential, public, restricted, highly restricted, user information, and so on. Users are able to create their own data labels. Once the regular expression data is populated, backup software will evaluate these expressions. For every match, it will record the file along with the data label in the backup software catalog.

For data that already has data labels, the DLRE can honor them and save them as part of the backup catalog. These labels can be stored in a number of locations such as extended attributes as part of a filesystem, within each individual file or in a separate database. During a normal backup process, the backup software will discover the existing data labels, using the appropriate APIs, and add them to its own backup catalog that identifies each file with the corresponding data label.

Once the data labels have been collected for each file, certain restrictions or lack of restrictions can be applied to them across the backup system. The way to achieve this outcome is to integrate the backup software with the Data Label Rules Engine (DLRE). The backup software for each backup/replication/tiering/deletion phase, would communicate with the DLRE in real time (no pre/post process). The DLRE, in response to the backup software, would provide a set of rules that the backup software will have to follow. While embodiments propose that DLRE to be called inline during the backup/replication/tiering/deleting phase, it is not limited to that model and can also be called as a pre-/post-process. For example, if the backup system identified or discovered files that had a data label of highly restrictive, it would communicate with the DLRE, while the backup is happening, and the DLRE would respond with: for all highly restrictive files, those files must be retained forever (never deleted) and cannot be cloud tiered. It is then up to the backup software to enforce and follow this rule. The DLRE provides the rules that the backup software should respect. Another example could be: backup software communicates with the DLRE that it found no data labels. The DLRE would respond back with: for all files that do not have any data label can be deleted and can be cloud tiered. The DLRE would take precedence over any policies that are defined in the backup software if a conflict should occur.

In a backup workflow, the backup software will manage and monitor every component; this includes calling the source data, backup target and DLRE. The backup software will initiate the backup and control what files to backup. The same workflow can apply to replication, restore operations, and the like. For each file the backup software operates on, it will check its own table for files-to-data-label mapping that contains user supplied labels or discovered labels. This workflow is done for each file and until all files are processed. When completed, all files will have had all the DLRE rules applied to them.

System Implementation

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 6:
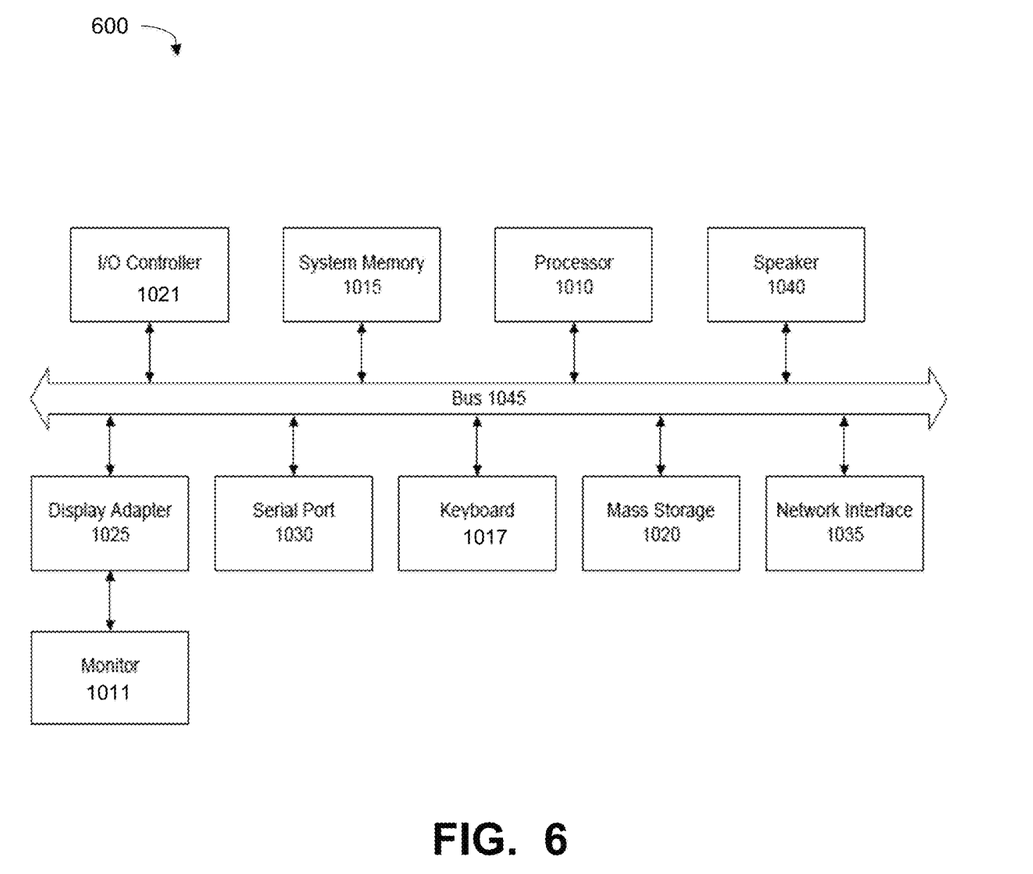
FIG. 6 is a system block diagram of a computer system used to execute one or more software components of a storage classifier process for backup systems, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 6 shows a system block diagram of a computer system used to execute one or more software components of the present system described herein. The computer system 600 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 600 shown in FIG. 6 is just one example of a computer system suitable for use with the present system.

Other configurations of subsystems suitable for use with the described embodiments will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the described embodiments. Additionally, steps may be subdivided or combined. As disclosed herein, software written in accordance certain embodiments may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of providing storage target recommendations for data to be backed up to backup storage comprising a plurality of disparate backup media, comprising:
   determining characteristics of source data for each file of the data to be backed up;
   receiving service level agreement information for the data to be backed up comprising recovery objectives for the data to be backed up;
   receiving an initial recommendation of optimum storage media for the data to be backed up based on data type;
   evaluating, for each file, one or more potential storage targets identified by the initial recommendation;
   computing a target score for each of the potential storage targets, wherein the target score is calculated as a function of a cost score, a performance score, a balancing score, and a data classifier score based on the initial recommendation of the optimum storage media; and
   identifying one or more recommended specific storage targets based on computed target scores for the potential storage targets.

2. The method of claim 1 further comprising providing, to a backup server executing a backup operation for the data to be backed up, the identified one or more recommended specific storage targets, and wherein the specific storage targets comprise one or more unique storage devices within a selection of different storage devices of the disparate backup media.

3. The method of claim 1 wherein the cost score is based on a relative cost per storage unit of the potential storage target.

4. The method of claim 1 wherein the performance score is a value indicating a relative ability of the potential storage target to meet a recovery time objective for a file.

5. The method of claim 1 wherein the balancing score is a value indicating a relative amount of storage capacity usage for a file type.

6. The method of claim 1 wherein the data classifier score is based on how close a recommended storage target is to the optimum storage media of the initial recommendation.

7. The method of claim 1 further comprising weighting each of the cost score, the performance score, and the balancing score, with a respective weighting factor to allow a user to emphasize one backup characteristic relative to other backup characteristics.

8. The method of claim 7 further comprising maintaining the weighting as storage factors in a database of a storage classifier functionally coupled to a backup server.

9. The method of claim 8 further comprising maintaining, in the storage classifier:
 a storage target list storing type, location, and capacity information of storage devices comprising the disparate backup media; and
 a product catalog storing product information of storage media eligible to be procured as potential storage targets.

10. The method of claim 9 further comprising using a product catalog to recommend one or more storage targets for use in future backup operations based on one or more optimized factors of cost, performance and balancing.

11. The method of claim 1 wherein the characteristics of the source data comprise at least one of: compressibility, format, deduplication, and confidentiality.

12. The method of claim 1 further comprising:
 calculating a shadow score for each of the cost score, the performance score, and the balancing score, wherein a shadow score represents a score assigned to a most optimum storage target;
 logging shadow scores over a period of time; and
 using the logged shadow scores to modify the initial recommendation.

13. A method of recommending storage targets among disparate storage media to a backup server executing a backup operation on data files, comprising:
 receiving, in a storage classifier and from the backup server, metadata specifying a name, type, and size of the storage media storing the data files;
 receiving from the backup server Service Level Agreement information including retention time, Recovery Point Objective, and Recovery Time Objective for the data files;
 receiving, in the backup server from a data labeler, policy recommendations from based on certain attributes of the data files;
 receiving, in the storage classifier from a data classifier, an initial recommendation for a storage type and location of each file of the data files;
 generating, from the storage classifier to the backup server, one or more recommended specific storage targets to backup software for each file of the data files; and
 calculating a target score for each of the recommended storage targets, wherein the target score is calculated as a function of a cost score, a performance score, a balancing score, and a data classifier score based on the initial recommendation.

14. The method of claim 13 wherein the cost score is based on a relative cost per storage unit of the potential storage target, the performance score is a value indicating a relative ability of the potential storage target to meet a recovery time objective for a file, the balancing score is a value indicating a relative amount of storage capacity usage for a file type of each file of the data files, and the data classifier score is based on how close a recommended storage target is to the initial recommendation.

15. The method of claim 14 further comprising weighting each of the cost score, the performance score, and the balancing score, with a respective weighting factor to allow a user to emphasize one backup characteristic relative to other backup characteristics.

16. A system for recommending storage targets among disparate storage media to a backup server executing a backup operation on data files, comprising:
 a processor-based hardware storage classifier component receiving from the backup server, metadata specifying a name, type, and size of the storage media, and Service Level Agreement information including retention time, Recovery Point Objective, and Recovery Time Objective for the data files;
 a data labeler providing to the backup server, policy recommendations based on certain attributes of the data files; and
 a data classifier providing to the storage classifier, an initial recommendation for a storage type and location of each file of the data files, wherein the storage classifier further generates for the backup server one or more recommended specific storage targets to backup software for each file of the data files, and wherein the storage classifier yet further calculates a target score for each of the recommended storage targets, wherein the target score is calculated as a function of a cost score, a performance score, a balancing score, and a data classifier score based on the initial recommendation.

17. The system of claim 16 wherein the cost score is based on a relative cost per storage unit of the potential storage target, the performance score is a value indicating a relative ability of the potential storage target to meet a recovery time objective for a file, the balancing score is a value indicating a relative amount of storage capacity usage for a file type, and the data classifier score is based on how close a recommended storage target is to the initial recommendation, and further wherein each of the cost score, the performance score, and the balancing score are weighted with a respective weighting factor to allow a user to emphasize one backup characteristic relative to other backup characteristics.

* * * * *